US009667726B2

(12) United States Patent
Basir

(10) Patent No.: US 9,667,726 B2
(45) Date of Patent: May 30, 2017

(54) VEHICLE INTERNET RADIO INTERFACE

(75) Inventor: Otman A. Basir, Waterloo (CA)

(73) Assignee: RIDETONES, INC., Waterloo (CA)

( * ) Notice: Subject to any disclaimer, the term of this patent is extended or adjusted under 35 U.S.C. 154(b) by 0 days.

(21) Appl. No.: 12/824,733

(22) Filed: Jun. 28, 2010

(65) Prior Publication Data
US 2010/0330975 A1 Dec. 30, 2010

Related U.S. Application Data

(60) Provisional application No. 61/221,034, filed on Jun. 27, 2009.

(51) Int. Cl.
H04L 29/08 (2006.01)
(52) U.S. Cl.
CPC ............ H04L 67/12 (2013.01); H04L 67/306 (2013.01)
(58) Field of Classification Search
CPC ....... H04L 67/12; H04L 67/306; G06F 15/16; G10L 13/00; H04M 3/00
USPC .......... 455/418, 419, 420; 709/217; 704/260
See application file for complete search history.

(56) References Cited

U.S. PATENT DOCUMENTS

| 3,928,724 | A | 12/1975 | Andersen et al. |
| 4,083,003 | A | 4/1978 | Haemmig et al. |
| 4,532,052 | A | 7/1985 | Weaver et al. |
| 4,591,823 | A | 5/1986 | Horvat |
| 4,989,144 | A | 1/1991 | Barnett et al. |
| 5,177,685 | A | 1/1993 | Davis et al. |
| 5,246,073 | A | 9/1993 | Sandiford et al. |
| 5,488,360 | A | 1/1996 | Ray |
| 5,638,425 | A | 6/1997 | Meador et al. |
| 5,760,742 | A | 6/1998 | Branch et al. |
| 5,836,392 | A | 11/1998 | Urlwin-Smith |
| 5,912,951 | A | 6/1999 | Checchio et al. |
| 5,931,907 | A | 8/1999 | Davies et al. |
| 5,938,706 | A | 8/1999 | Feldman et al. |
| 5,944,783 | A | 8/1999 | Nieten |
| 5,963,618 | A | 10/1999 | Porter |
| 5,983,108 | A | 11/1999 | Kennedy et al. |

(Continued)

FOREIGN PATENT DOCUMENTS

| CA | 2405813 A1 | 11/2001 |
| DE | 19920227 A1 | 11/2000 |

(Continued)

OTHER PUBLICATIONS

International Search Report for PCT Application No. PCT/CA2006/000946, Nov. 8, 2006.

(Continued)

Primary Examiner — Lester Kincaid
Assistant Examiner — Sayed T Zewari
(74) Attorney, Agent, or Firm — Carlson, Gaskey & Olds, P.C.

(57) ABSTRACT

The invention provides a internet radio interface for use in vehicles. The interface allows a device unit, with wireless capability and voice interface technology, to communicate with a vehicle, mobile phone, and portal in order to manage and upload various user preferences to the device unit as set out by the user prior to getting into the vehicle. The device unit interacts with the user to permit various functions and access preferable channels as well as managing secondary functions of the user, including cell phone communications.

15 Claims, 2 Drawing Sheets

(56) References Cited

U.S. PATENT DOCUMENTS

| | | |
|---|---|---|
| 6,012,030 A | 1/2000 | French et al. |
| 6,041,300 A | 3/2000 | Ittycheriah et al. |
| 6,061,718 A | 5/2000 | Nelson |
| 6,088,650 A | 7/2000 | Schipper et al. |
| 6,147,598 A | 11/2000 | Murphy et al. |
| 6,176,315 B1 | 1/2001 | Reddy et al. |
| 6,192,364 B1 | 2/2001 | Baclawski |
| 6,192,986 B1 | 2/2001 | Urlwin-Smith |
| 6,196,317 B1 | 3/2001 | Hardy |
| 6,212,474 B1 | 4/2001 | Fowler et al. |
| 6,253,122 B1 | 6/2001 | Razavi et al. |
| 6,295,449 B1 | 9/2001 | Westerlage et al. |
| 6,314,094 B1 | 11/2001 | Boys |
| 6,356,869 B1 | 3/2002 | Chapados et al. |
| 6,362,748 B1 | 3/2002 | Huang |
| 6,377,825 B1 | 4/2002 | Kennedy et al. |
| 6,385,202 B1 | 5/2002 | Katseff et al. |
| 6,389,337 B1 | 5/2002 | Kolls |
| 6,529,863 B1 | 3/2003 | Ball et al. |
| 6,553,102 B1 | 4/2003 | Fogg et al. |
| 6,574,531 B2 | 6/2003 | Tan et al. |
| 6,580,973 B2 | 6/2003 | Leivian et al. |
| 6,594,557 B1 | 7/2003 | Stefan et al. |
| 6,607,035 B1 | 8/2003 | Reddy et al. |
| 6,615,130 B2 | 9/2003 | Myr |
| 6,622,083 B1 | 9/2003 | Knockeart et al. |
| 6,650,997 B2 | 11/2003 | Funk |
| 6,690,268 B2 | 2/2004 | Schofield et al. |
| 6,697,638 B1 | 2/2004 | Larsson et al. |
| 6,711,474 B1 | 3/2004 | Treyz et al. |
| 6,714,223 B2 | 3/2004 | Asami et al. |
| 6,721,633 B2 | 4/2004 | Funk et al. |
| 6,724,863 B1 | 4/2004 | Bedingfield |
| 6,731,239 B2 | 5/2004 | Wall et al. |
| 6,738,742 B2 | 5/2004 | Smith et al. |
| 6,748,211 B1 | 6/2004 | Isaac et al. |
| 6,764,981 B1 | 7/2004 | Eoff et al. |
| 6,788,935 B1 | 9/2004 | McKenna et al. |
| 6,788,949 B1 | 9/2004 | Bansal |
| 6,799,201 B1 | 9/2004 | Lee et al. |
| 6,812,888 B2 | 11/2004 | Drury et al. |
| 6,812,942 B2 | 11/2004 | Ribak |
| 6,839,669 B1 | 1/2005 | Gould et al. |
| 6,842,510 B2 | 1/2005 | Sakamoto |
| 6,895,084 B1 | 5/2005 | Saylor et al. |
| 6,895,257 B2 | 5/2005 | Boman et al. |
| 6,895,310 B1 | 5/2005 | Kolls |
| 6,909,947 B2 | 6/2005 | Douros et al. |
| 6,925,154 B2 | 8/2005 | Gao et al. |
| 6,944,679 B2 | 9/2005 | Parupudi et al. |
| 6,968,272 B2 | 11/2005 | Knockeart et al. |
| 6,970,703 B2 | 11/2005 | Fuchs et al. |
| 6,970,783 B2 | 11/2005 | Knockeart et al. |
| 6,972,669 B2 | 12/2005 | Saito et al. |
| 6,982,635 B2 | 1/2006 | Obradovich |
| 7,039,166 B1 | 5/2006 | Peterson et al. |
| 7,049,982 B2 | 5/2006 | Sleboda et al. |
| 7,050,834 B2 | 5/2006 | Harwood et al. |
| 7,062,286 B2 | 6/2006 | Grivas et al. |
| 7,069,118 B2 | 6/2006 | Coletrane et al. |
| 7,085,629 B1 | 8/2006 | Gotou et al. |
| 7,091,160 B2 | 8/2006 | Dao et al. |
| 7,113,911 B2 | 9/2006 | Hinde et al. |
| 7,117,075 B1 | 10/2006 | Larschan et al. |
| 7,127,271 B1 | 10/2006 | Fujisaki |
| 7,151,997 B2 | 12/2006 | Uhlmann et al. |
| 7,187,947 B1 | 3/2007 | White et al. |
| 7,191,040 B2 | 3/2007 | Pajakowski et al. |
| 7,212,814 B2 | 5/2007 | Wilson et |
| 7,228,224 B1 | 6/2007 | Rosen et al. |
| 7,257,426 B1 | 8/2007 | Witkowski et al. |
| 7,280,975 B1 | 10/2007 | Donner |
| 7,286,825 B2 | 10/2007 | Shishido et al. |
| 7,286,857 B1 | 10/2007 | Walker et al. |
| 7,289,796 B2 | 10/2007 | Kudoh |
| 7,296,066 B2 | 11/2007 | Lehaff et al. |
| 7,346,320 B2 | 3/2008 | Chumbley et al. |
| 7,346,374 B2 | 3/2008 | Witkowski et al. |
| 7,356,474 B2 | 4/2008 | Kumhyr |
| 7,363,229 B2 | 4/2008 | Falcon et al. |
| 7,366,795 B2 | 4/2008 | O'Neil et al. |
| 7,386,376 B2 | 6/2008 | Basir et al. |
| 7,400,879 B2 | 7/2008 | Lehaff et al. |
| 7,412,078 B2 | 8/2008 | Kim |
| 7,412,328 B2 | 8/2008 | Uhlmann et al. |
| 7,444,286 B2 | 10/2008 | Roth et al. |
| 7,461,344 B2 | 12/2008 | Young et al. |
| 7,496,514 B2 | 2/2009 | Ross et al. |
| 7,505,951 B2 | 3/2009 | Thompson et al. |
| 7,526,431 B2 | 4/2009 | Roth et al. |
| 7,554,435 B2 | 6/2009 | Tengler et al. |
| 7,567,542 B2 | 7/2009 | Rybak et al. |
| 7,643,619 B2 | 1/2010 | Jung |
| 7,646,296 B2 | 1/2010 | Ohki |
| 7,653,545 B1 | 1/2010 | Starkie |
| 7,689,253 B2 | 3/2010 | Basir |
| 7,693,720 B2 | 4/2010 | Kennewick et al. |
| 7,769,364 B2 | 8/2010 | Logan et al. |
| 7,787,907 B2 | 8/2010 | Zeinstra et al. |
| 7,801,283 B2 | 9/2010 | Harwood et al. |
| 7,859,392 B2 | 12/2010 | McClellan et al. |
| 7,865,309 B2 | 1/2011 | Taylor |
| 7,881,864 B2 | 2/2011 | Smith |
| 7,912,186 B2 | 3/2011 | Howell et al. |
| 7,948,969 B2 | 5/2011 | Boys |
| 7,983,811 B2 | 7/2011 | Basir et al. |
| 8,015,010 B2 | 9/2011 | Basir |
| 8,060,285 B2 | 11/2011 | Chigusa |
| 8,090,848 B2 | 1/2012 | Maes et al. |
| 8,195,467 B2 | 6/2012 | Mozer et al. |
| 8,218,737 B2 | 7/2012 | Odinak |
| 8,289,186 B2 | 10/2012 | Osafune |
| 8,350,721 B2 | 1/2013 | Carr |
| 2001/0005854 A1 | 6/2001 | Murata et al. |
| 2001/0021640 A1 | 9/2001 | Lappe |
| 2001/0056345 A1 | 12/2001 | Guedalia |
| 2002/0032042 A1 | 3/2002 | Poplawsky et al. |
| 2002/0041659 A1 | 4/2002 | Beswick et al. |
| 2002/0152264 A1 | 10/2002 | Yamasaki |
| 2003/0023352 A1* | 1/2003 | Ogino et al. ............... 701/1 |
| 2003/0114202 A1 | 6/2003 | Suh et al. |
| 2003/0152247 A1* | 8/2003 | Okajima et al. ............ 382/100 |
| 2003/0181543 A1 | 9/2003 | Reddy et al. |
| 2003/0231550 A1 | 12/2003 | Macfarlane |
| 2004/0001575 A1 | 1/2004 | Tang |
| 2004/0058647 A1 | 3/2004 | Zhang et al. |
| 2004/0082340 A1 | 4/2004 | Eisinger |
| 2004/0090950 A1 | 5/2004 | Lauber et al. |
| 2004/0102188 A1 | 5/2004 | Boyer et al. |
| 2004/0104842 A1 | 6/2004 | Drury et al. |
| 2004/0116106 A1 | 6/2004 | Shishido et al. |
| 2004/0145457 A1 | 7/2004 | Schofield et al. |
| 2004/0158367 A1 | 8/2004 | Basu et al. |
| 2004/0182576 A1 | 9/2004 | Reddy et al. |
| 2004/0185915 A1 | 9/2004 | Ihara et al. |
| 2004/0193420 A1 | 9/2004 | Kennewick et al. |
| 2004/0243406 A1 | 12/2004 | Rinscheid |
| 2004/0257210 A1 | 12/2004 | Chen et al. |
| 2005/0046584 A1 | 3/2005 | Breed |
| 2005/0049781 A1 | 3/2005 | Oesterling |
| 2005/0054386 A1 | 3/2005 | Chung |
| 2005/0088320 A1 | 4/2005 | Kovach |
| 2005/0107132 A1 | 5/2005 | Kamdar et al. |
| 2005/0107944 A1 | 5/2005 | Hovestadt et al. |
| 2005/0130631 A1 | 6/2005 | Maguire et al. |
| 2005/0131677 A1 | 6/2005 | Assadollahi |
| 2005/0135573 A1 | 6/2005 | Harwood et al. |
| 2005/0143134 A1 | 6/2005 | Harwood et al. |
| 2005/0174217 A1 | 8/2005 | Basir et al. |
| 2005/0230434 A1 | 10/2005 | Campbell et al. |
| 2005/0285743 A1 | 12/2005 | Weber |
| 2005/0288190 A1 | 12/2005 | Dao et al. |
| 2006/0009885 A1 | 1/2006 | Raines |
| 2006/0030298 A1 | 2/2006 | Burton et al. |

(56) References Cited

U.S. PATENT DOCUMENTS

| | | |
|---|---|---|
| 2006/0052921 A1 | 3/2006 | Bodin et al. |
| 2006/0055565 A1 | 3/2006 | Kawamata et al. |
| 2006/0089754 A1 | 4/2006 | Mortenson |
| 2006/0101311 A1 | 5/2006 | Lipscomb et al. |
| 2006/0123053 A1 | 6/2006 | Scannell, Jr. |
| 2006/0193278 A1 | 8/2006 | Theimer |
| 2006/0214783 A1 | 9/2006 | Ratnakar |
| 2006/0217858 A1 | 9/2006 | Peng |
| 2006/0271275 A1 | 11/2006 | Verma |
| 2007/0033531 A1* | 2/2007 | Marsh ......................... 715/738 |
| 2007/0038360 A1 | 2/2007 | Sakhpara |
| 2007/0043574 A1 | 2/2007 | Coffman et al. |
| 2007/0050108 A1 | 3/2007 | Larschan et al. |
| 2007/0061401 A1 | 3/2007 | Bodin et al. |
| 2007/0073812 A1 | 3/2007 | Yamaguchi |
| 2007/0106739 A1 | 5/2007 | Clark et al. |
| 2007/0118380 A1 | 5/2007 | Konig |
| 2007/0162552 A1 | 7/2007 | Shaffer et al. |
| 2008/0004875 A1 | 1/2008 | Chengalvarayan et al. |
| 2008/0027643 A1 | 1/2008 | Basir et al. |
| 2008/0031433 A1 | 2/2008 | Sapp et al. |
| 2008/0071465 A1 | 3/2008 | Chapman et al. |
| 2008/0119134 A1 | 5/2008 | Rao |
| 2008/0132270 A1 | 6/2008 | Basir |
| 2008/0133230 A1 | 6/2008 | Herforth |
| 2008/0140408 A1* | 6/2008 | Basir ......................... 704/260 |
| 2008/0153513 A1* | 6/2008 | Flake et al. ................ 455/456.3 |
| 2008/0201135 A1 | 8/2008 | Yano |
| 2008/0252487 A1 | 10/2008 | McClellan et al. |
| 2008/0263451 A1 | 10/2008 | Portele et al. |
| 2008/0270015 A1 | 10/2008 | Ishikawa et al. |
| 2008/0306740 A1 | 12/2008 | Schuck et al. |
| 2009/0011799 A1 | 1/2009 | Douthitt et al. |
| 2009/0023406 A1 | 1/2009 | Ellis et al. |
| 2009/0055187 A1 | 2/2009 | Leventhal et al. |
| 2009/0099836 A1 | 4/2009 | Jacobsen et al. |
| 2009/0106036 A1 | 4/2009 | Tamura et al. |
| 2009/0124272 A1 | 5/2009 | White et al. |
| 2009/0161841 A1 | 6/2009 | Odinak |
| 2009/0176522 A1 | 7/2009 | Kowalewski et al. |
| 2009/0204410 A1 | 8/2009 | Mozer et al. |
| 2009/0259349 A1 | 10/2009 | Golenski |
| 2009/0298474 A1 | 12/2009 | George |
| 2009/0318119 A1 | 12/2009 | Basir et al. |
| 2010/0023246 A1 | 1/2010 | Zhao et al. |
| 2010/0036595 A1 | 2/2010 | Coy et al. |
| 2010/0097239 A1 | 4/2010 | Campbell et al. |
| 2010/0100307 A1 | 4/2010 | Kim |
| 2010/0130180 A1 | 5/2010 | Lim |
| 2010/0137037 A1 | 6/2010 | Basir |
| 2010/0138140 A1 | 6/2010 | Okuyama |
| 2010/0159968 A1 | 6/2010 | Ng |
| 2010/0189120 A1* | 7/2010 | Diab et al. .................... 370/401 |
| 2010/0198428 A1 | 8/2010 | Sultan et al. |
| 2010/0211301 A1 | 8/2010 | McClellan |
| 2010/0222939 A1 | 9/2010 | Namburu et al. |
| 2010/0280884 A1 | 11/2010 | Levine et al. |
| 2011/0302253 A1 | 12/2011 | Simpson-Anderson et al. |

FOREIGN PATENT DOCUMENTS

| | | |
|---|---|---|
| DE | 102007062958 A1 | 6/2009 |
| EP | 1463345 A2 | 9/2004 |
| EP | 1 575 225 A2 | 9/2005 |
| EP | 1701247 A2 | 9/2006 |
| EP | 1568970 B1 | 12/2006 |
| EP | 901000 B1 | 2/2007 |
| EP | 1575225 B1 | 9/2007 |
| EP | 1840523 B1 | 3/2011 |
| EP | 1986170 B1 | 4/2011 |
| GB | 2329970 A | 4/1999 |
| GB | 2 366 157 A | 2/2002 |
| GB | 2366157 B | 2/2003 |
| WO | 2006/087672 | 8/2006 |
| WO | 2007/002753 A2 | 1/2007 |
| WO | 2007002753 A2 | 1/2007 |
| WO | 2007081929 A2 | 7/2007 |
| WO | 2009/152614 A1 | 12/2009 |

OTHER PUBLICATIONS

European Search Report for EP Application No. 06752782.0, Mar. 1, 2010.

Supplementary European Search Report for EP Application No. 10791126.5, Jul. 23, 2012.

* cited by examiner

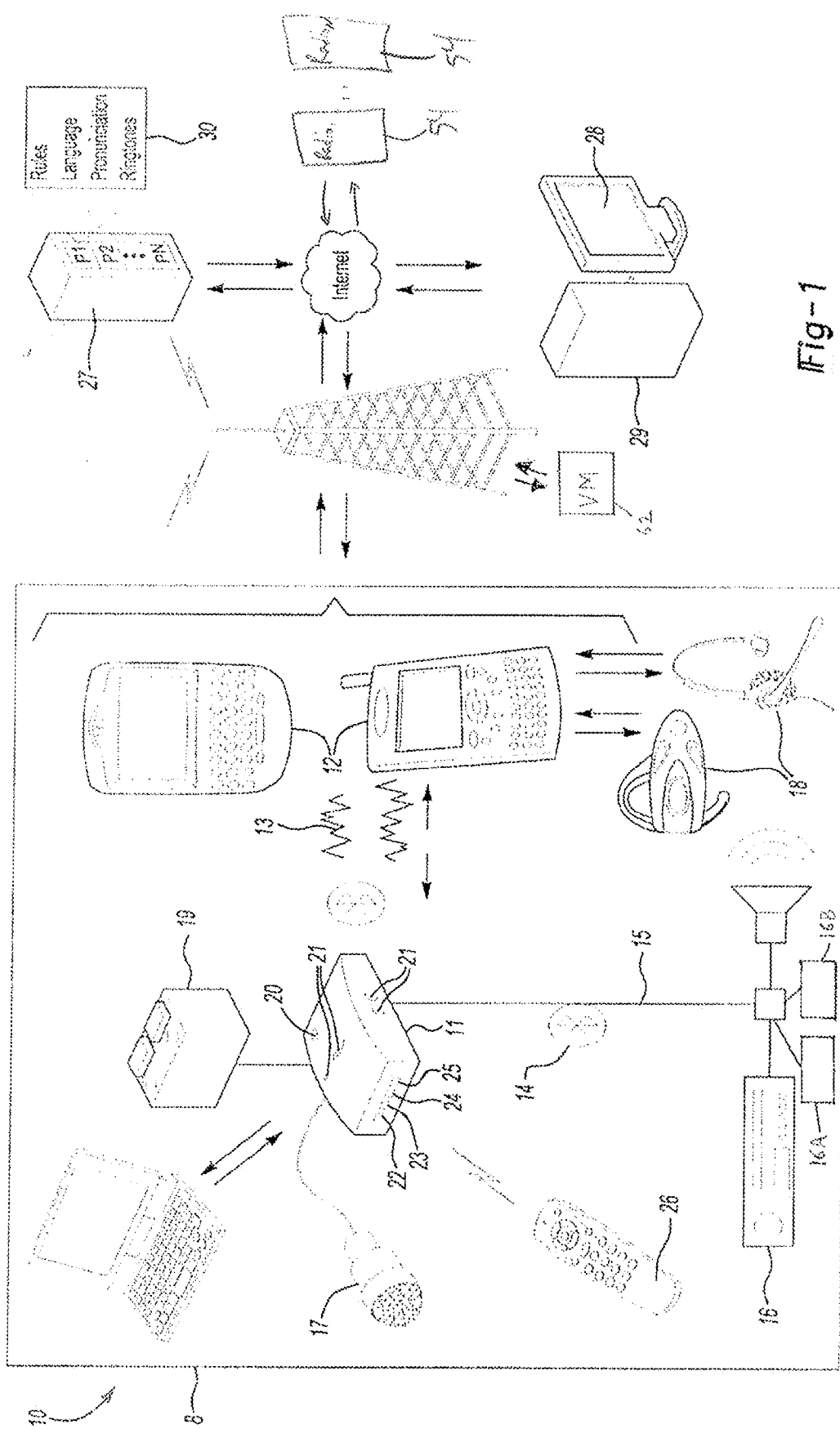

VEHICLE INTERNET RADIO INTERFACE

This application claims priority to U.S. Provisional Application Ser. No. 61/221,034 filed Jun. 27, 2009.

BACKGROUND OF THE INVENTION

The use of internet radio in vehicles has become much more prevalent. People often have different interests in what stations they will listen to. The use of internet radio has provided a much broader array of stations for users to choose from as well as the ability to access a plethora of genres.

Along with accessing many different types of music no longer available, internet radio provides the ability to strictly define the parameters of what a person chooses to listen to by allowing that person to specifically find the songs, artists, and genres he is looking for at any particular time.

SUMMARY OF THE INVENTION

Finding these stations becomes more difficult using internet radio because it offers more choices than AM/FM radio. Internet radio can have almost an unlimited number of channels and genres. The preferences of drivers can change on many different time intervals, including day-to-day or hour-to-hour. Because of this, drivers change the channel they are listening to very frequently. This causes driving to become unsafe as drivers look down at their radio, taking their attention off the road while they attempt to find what they are looking for.

It is also cumbersome for a driver to have to scroll through many channels of internet radio that are unwanted to arrive at a preferred station of interest. While the increase in the number of channels can be viewed in a positive light, it also makes it more difficult to find a channel you are looking for. It would be much more practical for a driver to be able to quickly find the channels he is looking for. In addition, many drivers make or receive phone calls and emails while in their vehicles, thus missing parts of programs they intend to listen to.

These and other features of the present invention can be best understood from the following specification and drawings, the following of which is a brief description.

DETAILED DESCRIPTION OF THE PREFERRED EMBODIMENT

Figure 1:
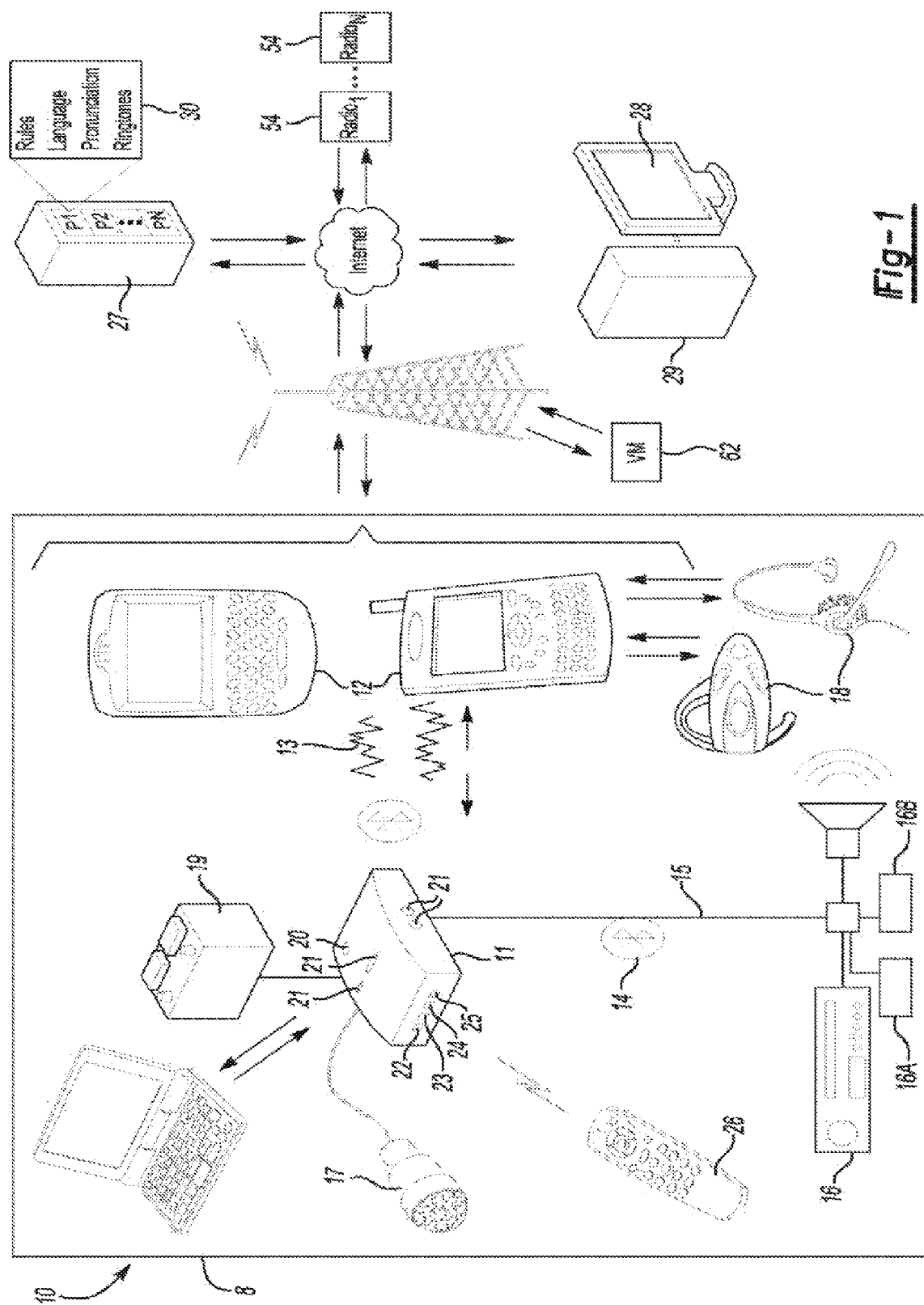
FIG. 1 schematically illustrates a communication system according to one embodiment of the present invention.
Figure 2:
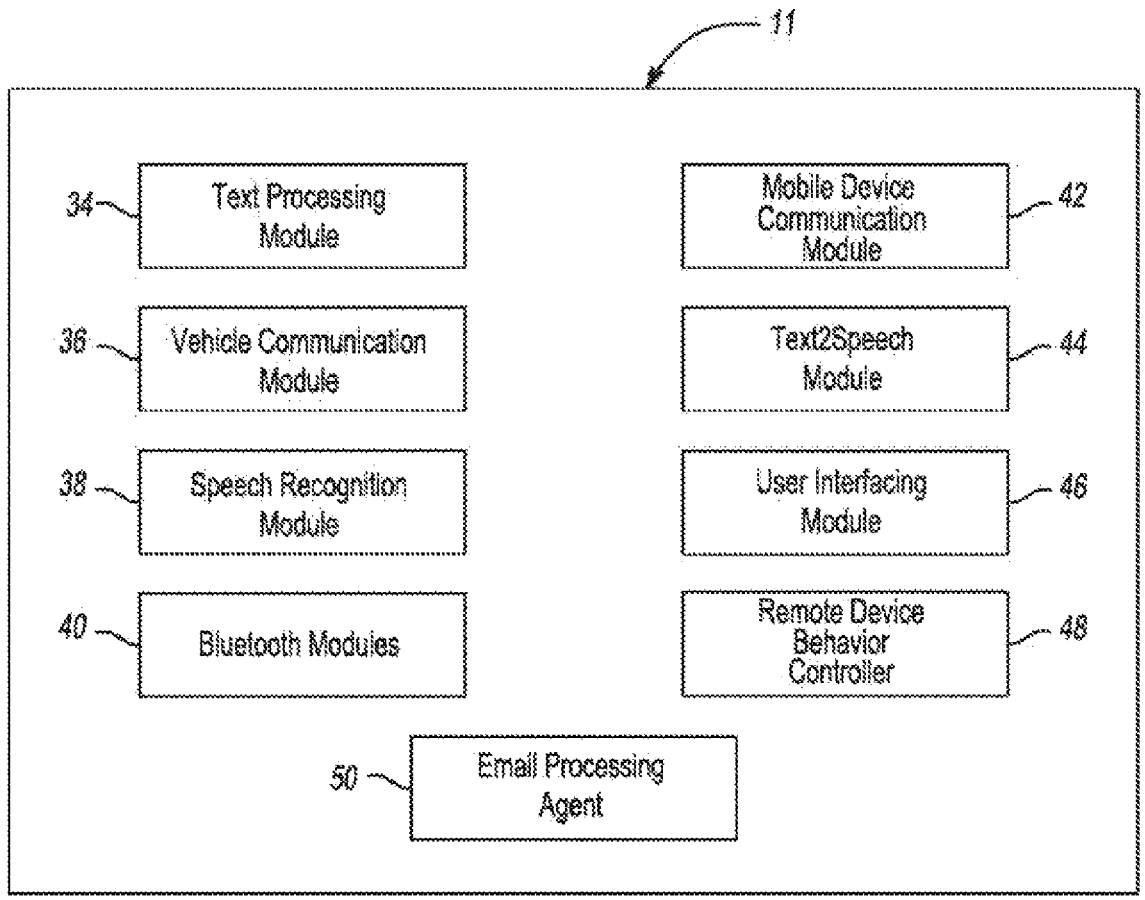

A communication system 10 is shown in FIG. 1 as implemented in a vehicle 8. The system 10 includes a device control unit 11 which, in one example, is mounted in a discreet location within the vehicle 8, such as under the dashboard, in the glove compartment, etc. The control unit 11 supports wireless communication via Bluetooth (IEEE 802.15.1) or any other wireless standard to communicate wirelessly with a cell phone, PDA, or other mobile communication device 12. In one example, all data 13 is encrypted prior to transmission. The audio output of the control unit 11 is transmitted either wirelessly 14 or through a direct, wired connection 15 to the vehicle's sound system, which may include a radio 16, satellite TV 16A, satellite radio 16B, etc. The audio input for the control unit 11 is obtained either through a directly connected microphone 17, through an existing vehicle hands-free system, or wirelessly though a headset 18 connected to the mobile communication device 12.

The control unit 11 connects to the vehicle's battery 19 for power. An AC adapter is available for use at home or in the office. For portable use in other vehicles, an optional "Y" or pass-through cable is available to plug into a cigarette lighter accessory socket for power.

The control unit 11 contains a recessed button 20 which enables the driver to do the following: register new or replacement remotes; pair the device with a new mobile communication device 12, and clear all preferences and reset the device to its factory default settings. The control unit 11 also has a set of four status lights 21 which display the following information: power and system health, vehicle connection status and activity, mobile communication device connection status and activity, and information access and general status.

In one example, the control unit 11 and the mobile communication device 12 recognize when the user, and the user's associated mobile communication device 12, are near to, or have entered the vehicle 8. This may be accomplished, for example, by Bluetooth pairing of the device 12 and the vehicle 8, or similar wireless communication initiation protocols. Within this range, the handheld device 12 changes from its normal, self-contained operating mode, to an immersive communication mode, where it is operated through the control unit 11. As will be described in more detail below, among other things, this mode enables the user to hear their emails played through the vehicle's sound system 16, or, alternatively, and if so equipped, played through the sound system of the mobile communication device 12 (e.g. headphones 18). Microphones 17 in the vehicle 8 or on the mobile communication device 12 detect user-generated voice commands. Thus, the user is not required to change modes on the mobile communication device 12; instead, the control unit 11 and associated mobile communication device 12 recognize that the user is proximate the vehicle 8 and adjust the mode accordingly.

In addition to adjusting the mode based on vehicle proximity, the system 10 may adjust between a public and a private mode. For instance, as explained above, the system's immersive communication mode ordinarily occurs when the user is proximate the vehicle 8. The immersive communication mode may have a public setting and a private setting. The public setting plays the emails over headphones 18 associated with the mobile communication device 12. Such a setting prevents a user from disturbing other occupants of the vehicle 8. The private setting plays the emails over the vehicle sound system 16, and is ordinarily used when the user is the only occupant in the vehicle 8.

Of course, such system settings may be adjusted by the user and their particular preferences in their user profile. For example, the user may prefer to switch to the immersive communication mode when the mobile communication device 12 and user are within a certain distance from the vehicle 8, whereas another user may switch modes only when the mobile communication device 12 and user have entered the vehicle 8. Further, the user may want to operate the control unit 11 and associated device 12 in a public mode, even if other occupants are in the vehicle 8.

Similarly, the system 10 recognizes when the user leaves the vehicle 8 and the mobile communication device 12 reverts to a self-contained (normal) mode. The mobile communication device 12 may also record the vehicle's location when the user leaves the vehicle 8 (based upon GPS or other information). Accordingly, the user can recall the vehicle position at a later time, either on the device or elsewhere on the system, which may aid the user in locating the vehicle 8.

The device has multiple USB ports 22 (or other standard protocol). The ports which serve the following functions: to enable the driver to store preferences, settings, and off-line memos and transcriptions on a standard portable media (e.g. flash drive); to permit future expansion, upgrades, and add-on features; and to connect an Ethernet dongle for high-speed internet access. In one example the control unit 11 has Internet access without the use of a dongle. In addition, the control unit 11 has a dual-purpose USB 2.0 port (or other standard protocol) which in addition to the features mentioned above, provides "on-the-go" functionality by directly connecting to the port of a notebook computer with a standard cable (i.e. similar to connecting a portable camera or GPS unit directly to a computer).

Other ports on the control unit 11 include an ⅛" audio jack 23 to connect to a car stereo without Bluetooth support, a ⅛" microphone jack 24 to support external high-quality microphones for hands-free calling, and a ⅛" stereo headset jack 25 for use away from the vehicle or in a vehicle without Bluetooth support.

The system 10 also includes an optional remote control 26 to interact with the control unit 11. The remote control contains lithium batteries, similar to that of a remote keyless entry remote for a common vehicle.

In order to provide security and privacy, the device is operable to use both authentication and encryption. Voice-based biometrics may also be used to further enhance security.

The driver stores his or her settings for the device in their settings profile 30, which may be stored in a database on an Internet server 27 (see FIG. 1), or may be stored elsewhere, such as on the mobile device 12 or the control unit 11. In the example where the profile 30 is stored on the server 27, the profile 30 may be pushed to the mobile device 12. Alternatively, or additionally, the control unit 11 utilizes the Internet access provided by the driver's mobile communication device 12 to download the driver's profile 30 via the Internet. Of course, the control unit 11 would use its own Internet access if available, and not that of the mobile communication device 12. The control unit 11 is operable to use the pairing information from the mobile communication device 12 to retrieve the correct profile 30 from the server 27. If the profile 30 has already been downloaded to the control unit 11 or mobile device 12, the control unit 11 or mobile device 12 may just check for changes and updates on the server 27. Each profile 30 on the server 27 contains a set of rules that the control unit 11 uses to make decisions on content delivery to the driver. The driver can access and modify their profile 30 on the Internet server 27 through either the Internet using a web-based interface 28 on a user computer 29, or through a simple interface directly accessible from the associated mobile communication device 12. Alternatively, the profile 30 may be always stored and modified on the control unit 11 only and can be accessed via the mobile communication device 12 and/or via a USB connection to a laptop or desktop computer.

Figure 2:
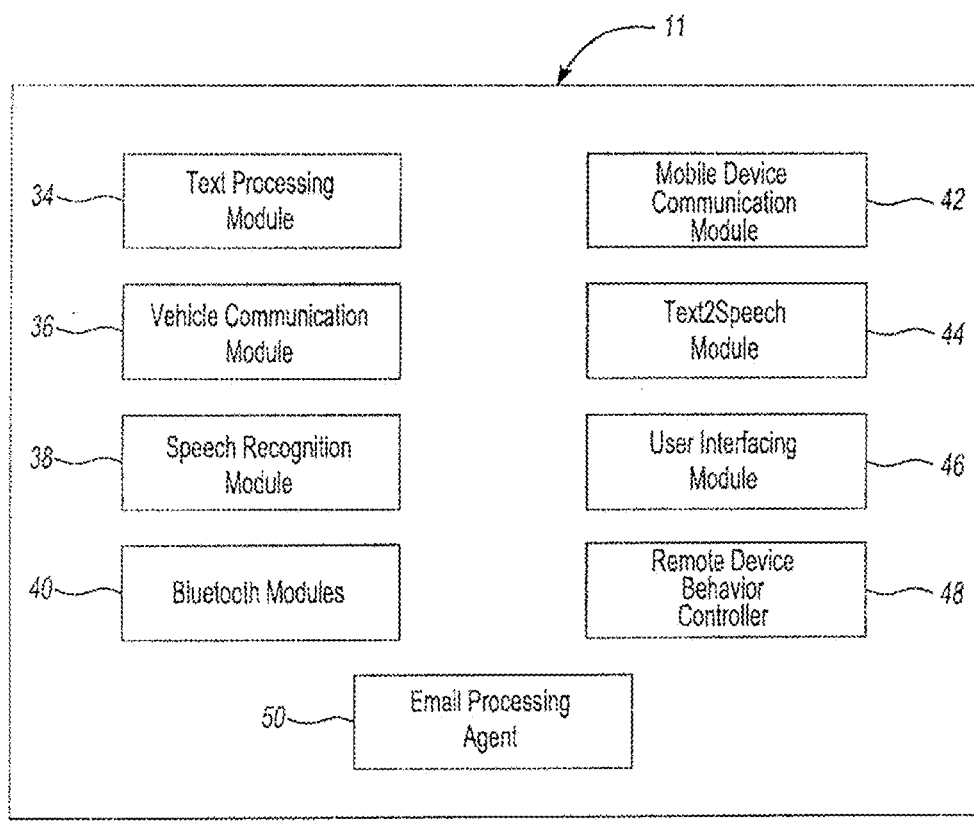
FIG. 2 illustrates some of the components of the control unit of the communication system of FIG. 1.

As shown in FIG. 2, the control unit 11 includes a text processing module 34, a vehicle communication module 36, a speech recognition module 38, Bluetooth (or other wireless communication) modules 40, a mobile communication device communication module 42, a text-to-speech module 44, a user interface module 46, and a remote device behavior controller 48. The control unit 11 has an email processing agent 50 that processes email messages and determines the identity of the sender, whether the message has an attachment, and if so what type of attachment, and then extracts the body-text of the message. The control unit 11 also determines if a message is a reminder, news, or just a regular email message. The control unit 11 is operable to use a data mining algorithm to determine if any parts of the email should be excluded (e.g. a lengthy signature).

Hands-Free Email

One feature of the system is hands-free email. Using the text-to-speech module 44, the control unit 11 can read email to the driver. When new email arrives, the mobile device 12 uses the profile 30 to guide an intelligent filtering and prioritization system which enables the driver to do the following: ensure that emails are filtered and read in order of priority, limit the frequency of new email interruptions, send automatic replies without driver intervention, and forward certain emails to a third-party without interruption. In addition, prior to being read out loud, the control unit 11 processes emails to optimize clarity. Part of that process involves detecting acronyms, symbols, and other more complex structures and ensuring that they can be easily understood when read. The control unit 11 is operable to provide intelligent email summarization in order to reduce the time required to hear the important content of email when read out loud.

The driver can interact with the control unit 11 using voice commands, including "go back" and "go forward," to which the control unit 11 responds by going back to the previous phrase or sentence or the next phrase or sentence in the email respectively. In addition, speaking "go back, go back" would back up two phrases or sentences.

Additional hands-free email features include a time-saving filtering system which allows the driver to hear only the most important content or meaning of an email. Another email-related feature is the ability to download custom email parsers to add a new dimension to audible email, and to parse informal email styles (e.g., 18r, ttyl).

The hands-free email functionality includes content-rich notification. When providing notification of a new email, the control unit 11 provides a quick summary about the incoming email, enabling the driver to prioritize which messages are more important. Examples include "You have mail from Sally" (similar to a caller-ID for email), or "You have an important meeting request from Cathy." The control unit 11 looks up the known contact names based upon the sender's email address in the user's address book on the mobile communication device 12. The control unit 11 uses known contact names to identify the parties of an email instead of just reading the cryptic email addresses out loud.

In addition to reading email, the control unit 11 also enables the driver to compose responses. The driver can send a reply using existing text or voice templates (e.g. "I'm in the car call me at 'number,'" or "I'm in the car, I will reply as soon as I can"). New emails can also be created and sent with one or more voice recording attachments (e.g., .wav file, .mp3 file). The driver is also provided the option of calling the sender of the email on the phone using existing contact information in the address book, or responding to meeting requests and calendar updates (e.g. Outlook). Emails can also be created as freeform text responses by dictating the contents of the email. The device then translates that into text form for email transmission. An intelligent assistant will be immediately available to suggest possible actions and to provide help as needed. Again all of these options are prompted by verbal inquires by the control unit 11 which can be selected by voice commands by the driver.

The control unit 11 supports multiple email accounts, and email can be composed from any existing account. Incoming email can also be intelligently handled and prioritized based upon account. Optional in-vehicle email addresses on a custom domain are available. Emails sent from this address would include a notification that the email was composed while in transit. When composing an email to an in-vehicle email address, the sender knows that the email will be read out loud in a vehicle. If the traditional email is "george@work.net," then the in-vehicle address may be "george@driving.net." Optional enhanced existing email addresses are also available on supported email systems. For example, if the traditional email is "george@work.com," an enhanced in-vehicle address of "george+driving@work.com" may be selected.

Enhanced Hands-Free Telephone Calls

Another feature of this invention is enhanced hands-free telephone calls. This includes transparent use of any existing hands-free system. All incoming telephone calls can use either the existing vehicle hands-free system or the user headset 18. If an expected important email arrives while the driver is on the phone, an "email-waiting" indicator (lights and/or subtle tones) will provide subtle notification without disrupting the conversation. The headset 18 can be activated at any time for privacy or to optimize clarity. The control unit 11 will seamlessly switch from the vehicle hands-free system to the private headset 18 for privacy.

The control unit 11 also features enhanced caller-ID. The device announces incoming calls by reading the caller name or number out loud (e.g. "This is a call from John Doe, do you want to answer it?"). This eliminates the need to look away from the road to find out who is calling. Vehicle-aware screening can also automatically forward specific calls to voicemail or to another number when driving, again based upon the driver's profile. Normal forwarding rules will resume when leaving the vehicle.

The control unit 11 also provides voice activated answering and calling. When the control unit 11 announces a telephone call, the driver can accept the call using a voice command. The driver can use voice commands associated with either contacts in an address book or with spoken phone numbers to place outgoing telephone calls (e.g. "Call Krista").

The user can say, "Call by name," to call someone in the user's contacts, or "Call by number," and then speak the phone number to the control unit 11 (for example, the control unit 11 listens to all of the numbers, without reference to the user's contacts). Alternatively, the user can say, "Call by spelling" or "Call by alphabet," in which case the user then spells the name of the contact. Once the user has dictated enough letters to define a unique contact, the control unit 11 confirms the contact choice (e.g. "do you want to call John Adams?"). In one example, the control unit 11 accepts spelling exemplary word, such as "A as in alpha," "B as in boy," "C as in cat," etc. The user does not have to use a particular word for each letter, but it is easier for the control unit 11 to recognize the letter with the confirming exemplary word (just as it is for humans).

Unified Information Management

Another feature of the present invention is that it provides unified information management. The control unit 11 provides a consistent interface for seamless access to incoming and outgoing telephone calls, email, and other sources of information. The existing hands-free interface automatically switches between telephone calls, reading email, and providing important notifications. When entering the vehicle, the control unit 11 automatically provides an enhanced voice-based interface, and when leaving the vehicle, the mobile communication device 12 automatically resumes normal operation. Email reading can also be paused to accept an incoming phone call, and can be resumed when the call is complete.

In addition, the driver can communicate with any contact through email, a phone call, or an SMS text message simply by speaking. The control unit 11 provides enhanced information for incoming telephone calls. The name and number, if available, are read out loud to ensure that the driver knows the caller without looking away from the road. A nickname, or other information located in an address book, may also be used for notification.

The driver can also reply to an email with a phone call. While reading an email, the driver can contact the sender by placing a telephone call with address book information. When a phone call is made, but the line is busy or no voicemail exists, the user is given the option of sending an email to the same contact instead. This eliminates the need to wait and try calling the person again.

Within their profile 30, the driver can prioritize between email and phone calls, so that an important email will not be interrupted by a less important phone call. In addition, custom mp3 (or other format) ring tones can be associated with both incoming emails and telephone calls. Ring tones can be customized by email from certain contacts, phone calls from certain contacts, or email about certain subjects. Custom "call waiting" audible indicators can be used when an important email arrives while on the phone, or when an important phone call arrives while reading or composing an email.

Enhanced Hands-Free Calendar

Another feature of the present invention is the enhanced hands-free calendar wherein the control unit 11 utilizes the calendar functionality of the user's mobile communication device 12. The control unit 11 reads the subject and time of calendar reminders out loud, and the driver can access additional calendar information with voice commands if desired. The driver can also perform in-transit schedule management by reviewing scheduled appointments (including date, time, subject, location and notes); accepting, declining, or forwarding meeting requests from supported systems (e.g. Outlook); scheduling meetings; and automatically annotating meetings with location information. The driver can also store location-based reminders, which will provide reminders the next time the vehicle is present in a specified geographical area, and automatically receive information associated with nearby landmarks. In addition, the driver could plan and resolve meeting issues by communicating directly with other participants' location-aware devices.

Do not Disturb

Another feature of the present invention is the "do not disturb" functionality. When passengers are present in the vehicle, the control unit 11 can be temporarily silenced. Even when silent, the control unit 11 will continue to intelligently handle incoming email, email forwarding, providing automatic email replies, and processing email as desired. A mute feature is also available.

Integrated Voice Memo Pad

Another feature of the present invention is the integrated voice memo pad, which enables the driver to record thoughts and important ideas while driving so they will not be forgotten while parking or searching for a memo pad or device. Memos can be transferred via email to the driver's inbox, or to any of the driver's contacts. Memos can also be wirelessly transferred to a computer desktop via the Bluetooth interface as the user arrives in the office, or transferred to a removable USB flash memory drive. Memos can also be annotated automatically using advanced context information including location, weather, and trip information. For example, "this memo was recorded at night in a traffic jam on the highway, halfway between the office and the manufacturing facility." Such augmented information can provide valuable cues when reviewing memos.

Access to Diverse Information

Another feature of the example embodiment of the present invention is the ability to access to diverse information. Information is available in audible form (text-to-speech) from a wide range of sources. First, the control unit 11 provides access to personal connectivity and time management information. This includes email (new and previously read), incoming caller name and number, SMS messages, MMS messages, telephone call logs, address book, calendar and schedule, and instant messages.

Second, the control unit 11 provides multi-format support. This includes email attachments that can be read out loud, including plain text, audio attachments (e.g., .wav, .mp3), HTML (e.g., encoded emails and web sites), plain text portions of Word and PowerPoint files, Adobe Portable Document format ("PDF"), OpenDocument formats, and compressed and/or encoded attachments of the above formats (e.g. .zip).

Third, the device provides environment and location awareness. This includes current location and navigation information, local weather conditions, vehicle status, and relevant location-specific information (e.g., where is "work", where is "home?").

Fourth, the control unit 11 provides remote access to information. This includes existing news sources (e.g. existing RSS feeds) and supported websites. This also includes subscription to value-added services including: weather, custom alerts (e.g. stock price triggers), traffic conditions, personalized news, e-books (not limited to audio books, but any e-book), personalized audio feeds, and personalized image or video feeds for passengers. The system obtains, translates, and provides personalized news content in audible form within a vehicle without explicit user requests. An individual may set their preferences by selecting from a set of common sources of information, or by specifying custom search criteria. When new information is available and relevant to the individual's preferences, it is read out loud to the individual when appropriate. Appropriate instances can be specified by the individual using a combination of in-vehicle presence detection, time-of-day, and importance of the information relative to other personal events including email, phone calls, meetings and text messages.

Individual preferences are fine tuned using negative feedback as specific stories and events are read out loud to the individual. This negative feedback is used in combination with the individual's personal search criteria to refine the relevance of future personalized content. In addition to online news content, the individual may also select other available online content, including stock market events and general web search terms. Some examples of personalized content include:

Weather
Custom alerts (e.g. stock price triggers)
Traffic conditions
Personalized news
e-books (Not limited to audio-books, but any e-book)
Personalized audio feeds
Personalized image or video feeds for passengers All text information is parsed and translated to optimize intelligibility before being read out loud to the individual.

Notification rules can be set by the individual using any combination of time interval, in-vehicle presence, and importance of the news event with appropriate location aware hardware support, notification rules can also include location based constraints. Desired news content can be selected using predefined templates or custom search terms.

User feedback is incorporated to maintain historical information about the news events to which the individual listens, news events that are interrupted, and news events to which the individual provides explicit feedback. This information is used to help filter subsequent news information and provide the user with more relevant news information the longer they use the service.

To minimize the volume of wireless data transfer, all searching and selection of relevant content may be performed using a server with a wired data connection. Appropriate instances to present new information are detected locally (within the vehicle). When an appropriate instance occurs, a short request is sent to trigger the transmission of the most recent personalized news information from the search server.

Internet Radio

The control unit 11 provides a user voice interface for accessing internet radio. This allows for the user to give voice commands via spoken utterances or requests which the system recognizes. The system is also able to respond through the vehicle sound system 16 to perform a variety of functions.

In one example, the control unit 11 connects to the internet, specifically to one or more servers 54 designed to provide internet radio programming (any programming over any WAN). The internet radio servers 54 each provide one or more different channels of internet radio programming. Again, the control unit 11 may have its own internet connection or it may use the internet connection of the mobile device 12 and either connection could be via GPRS, CDMA, LTE, WiFi, Wi-Max, satellite or any other current or later-developed protocols.

Using the interface 28 to configure his profile 30, the user is able to take full advantage of the features of the vehicle internet radio interface. The user can configure his internet radio preferences before entering the vehicle 8. In one instance, he can create a list of channels which are preferable so that he can, when he is later in the vehicle 8, ask the control unit 11 to connect to any of the channels found in the list at his instruction. This instruction comes via the voice interface, which allows the user to communicate with the control unit 11 and give an instruction to find a certain channel on the list.

In one example, the user configures his profile 30 with regards to programs he wants to connect to if he is in the car and they are playing. For instance, a user may set a rule declaring "If I am in the car and program xyz is on, inform me of this event." If the user is in the car and the program is detected, the control unit 11 will ask the user to confirm he would like to listen to it via voice interface. The user can affirm or reject based on personal preference.

In another example, the user can configure his profile 30 to organize his preferred channels into categories. These categories may include, for example, news, sports, music, and other known categories. When these categories are sent to the mobile device 12, the user can access them in the vehicle 8 by requesting a particular category. When the category is requested, the preset channels set to that category by the user are offered and the user can instruct the control unit 11 which channel to play. In the alternative, the user can only choose the category and the control unit 11 can randomly determine a channel to play which fits the criteria of being in that category if the user chooses. The user is then getting the type of channel he wants without having to determine exactly which channel he wants to hear.

The user can configure his profile 30 for favorite artists, songs, genres, etc. Some internet radio servers 54 (e.g. Pandora, Grooveshark, etc) have the ability to play specific songs requested by a user. The control unit 11 may access these servers 54 and manage requests to these servers 54 according to the artists, songs, genres, etc in the user's profile 30. The servers 54 play the requested songs to the control unit 11 for presentation to the user.

In another example, the user can configure his profile 30 with preferences relating to vehicle function, passenger presence and/or environmental conditions. The user can configure his profile 30 to play certain categories based upon vehicle speed, whether the user is alone in the vehicle, whether it is raining (i.e. whether the windshield wipers are on), general weather conditions (including temperature). For example, the user can set his profile 30 as, "If I am driving fast, play category X. If I am driving slow, play category Y." The user can set his profile 30 to say, "If the temperature is below freezing, give me a traffic report," (temperature can be provided with a sensor in the control unit 11 or can be obtained for the local area over the internet or other wide area network). The user can configure programming based upon day of the week and time of day (e.g. "give me traffic reports between 4:30 pm and 5:30 pm" or "give me weekend event reports on Fridays").

Rules in the profile 30 can be created to select specific songs, artists, genres, stations, or other content based on a number of local and remote events, including user presence detection, passenger presence, telephony and inbox activity, vehicle driving behavior, temperature, weather, time, and others. These rules can be explicitly specified using a traditional interface (via computer), or implicitly created by using current status (i.e. creating a rule while raining may implicitly include rain as part of the rule). Rules of this nature help create a soundtrack or drive ambient audible sources most appropriate during each scenario, driven by explicit and implicit user preferences. More implicit or explicit rules can be created in-vehicle by noting settings of in-vehicle tactile devices, (volume knob, buttons/screen, touchscreen, or other interfaces that may exist within the vehicle involving direct contact with the hand). Rules created in the vehicle are uploaded by the control unit 11 to the profile 30.

Rules may also be location-based, if the location of the vehicle is known (e.g. from GPS or cell-tower triangulation). The delivery of specific events and content can be associated with one or more geographic regions, allowing the user to optionally choose to listen to "local" content while traveling, enabling relevant commercials, and enabling delivery of relevant audible content for key points of interest along a known journey. For example, when listening to a national program on an internet radio station, local advertisements could be provided to the user based upon a determination of that user's location. The local advertisements would be more relevant for that user.

Preferences are not limited to being specified on a server. They can also specified from a number of sources, including server, in-vehicle tacticle, in-vehicle voice-driven, and mobile-devices. Preferences are automatically synchronized between multiple sources with time-based conflict resolution (i.e. the server (27) may exist within the vehicle). The interface (28) may be audible, tactile, desktop, or web-based.

When multiple users are present in the same vehicle, the system may concurrently deliver independent content and interactions with each user where appropriate audible isolation is possible between users (e.g. if they are using headphones or earphones, or otherwise sufficiently audibly separated).

In another example, the server 27 will construct a default configuration for each profile 30. The default configuration can be determined based upon a number of different factors including: previously created lists by other users, user votes online, currently popular channels, and other available indicators. The default configuration is available when the user has not indicated any preferences in his profile 30. In another example, the user can opt for the default configuration when other passengers are in the car and different channels from those preferred by the user are necessary.

In one example, the user indicates his preferred channels in his profile 30. In addition to the uses above, the server 27 will also compose a program schedule of all channels in his list of preferred channels for the day. This includes what will play at specific times for use by the user in requesting specific shows and being able to tell the user when a requested show is on. The server 27 will send this schedule to the in-vehicle control unit 11.

Once the user has indicated his preferences in his profile 30, and the server 27 has sent the preferences to the control unit 11, there are many in-vehicle operations for the user. The user can ask, via voice interface, the control unit 11 to announce a channel schedule for the day for any channel in his channel list. The user can also request the control unit 11 to read his channel list to him so that he can choose a schedule to hear. The user can also choose a program from the channel schedule which he wishes to listen to and request a notice from the control unit 11 informing him when the program is about to begin. This allows the user to listen to another preferred channel until such time. In one example, the user can set different notification times through voice commands via the voice interface. For instance, the user can request he be notified of particular programs ten minutes before they begin. In the alternative, the user can set these preferences in the profile 30.

As previously stated, the user can also prompt the control unit 11 by using spoken utterances. In one example, the user may want to indicate that he wishes to initiate "internet radio," thus switching from other applicable media modes in the vehicle including compact disc, AM/FM radio, cassette tape, and other known media. These utterances are programmed into the voice interface to activate specific commands. In one instance, the utterance "internet radio," would signify the control unit 11 to shift the media in the vehicle to the internet radio option, while simultaneously uploading the latest preferences from the profile 30.

In one example, the user can ask the control unit 11 to search for a particular type of content in a channel. When such a channel is found, the control unit 11 connects to the channel that is currently broadcasting the requested type of content. Examples of the content include, but are not limited to: news, music of certain type, sports, and other known requested content types. In one instance, the user may say to the control unit 11, "I feel like listening to news." After this request, the control unit 11 will search for channels classified as news channels and when it finds one, it will play that channel for the user. In the alternative, the control unit 11 may request confirmation via voice interface that this particular channel is acceptable, and upon receiving confirmation will play the channel, or upon receiving disapproval will continue searching for another channel.

The user is also able to stop and interrupt the control unit 11 to make a request or give instructions on a course of action. In one example, the user can ask the control unit 11 to announce a list of all channels available in his configuration. The user can then interrupt the control unit 11 to ask it to connect to any channel in the list.

In one example, the control unit 11 is able to record a segment of the content being broadcasted by a channel. This can be done by user request, or in response to a secondary action handled by the control unit 11. This can be achieved foreground or background. When in the foreground the control unit 11 records the content while the user is listening to it allowing for later playback. When in the background, the user in this example can use the device unit's 11 other, secondary functions. The other functions able to be performed by the control unit 11 include such things as reading emails, making phone calls, text messaging, and other understood secondary features. In one instance, the user will make a phone call while in the vehicle. The user can ask the control unit 11 to record the channel until he indicates otherwise, and then play it back for him so that he does not miss any of the show. In the alternative, if the phone call is done through the control unit 11 via vehicle speakers 16, the control unit 11 can automatically record the channel. In addition, the content can be also emailed or saved to other storage media devices for portability and playing by other media players while outside the vehicle.

The control unit 11 can also handle other, secondary activities in conjunction with controlling the internet radio interface. The control unit 11 will monitor the mobile phone 12 activities of the phones connected to it. In one example, the system can be configured to interrupt an internet radio session to inform the user of an event, such as a phone call, new message, and new e-mail. The control unit 11 can be configured to automatically record (or pause and temporarily record in a buffer) the interrupted internet radio segment while the user is answering the phone call or message. This allows the user to not lose the interrupted content being broadcasted. In one example, the control unit 11 can be programmed to ignore all cell phone activity for a certain time period. The user may choose not to have any interruptions while driving and therefore may instruct or prefer the control unit 11 to ignore all phone calls, new messages, new e-mails, and similar events until after the vehicle is off, or until such a time as the user determines.

In one example, the user can configure the control unit 11 to record a specific program even when not listening to that channel. In this case the control unit 11 will automatically connect to the proper channel to record the program based on program schedule. The user can ask the control unit 11 to play the recorded content, the user can email it to another recipient (or send via other transports or protocols), or the user can save it to a media storage for playing by other media player. In the alternative, when the control unit 11 is directly connected to the server 54 via an embedded wireless data connection modem, the user may request that the program be recorded even when he is not in the vehicle 8.

Of course, such system settings may be adjusted by the user and their particular preferences. The control unit 11 is able to handle multiple different users in the same vehicle 8. In one example, each user has a user profile which is stored on the control unit 11. When more than one user profile is stored on the control unit 11, the control unit 11 requests identification upon being activated via voice interface. Upon receiving confirmed identity of the user, the control unit 11 is able to load the correct profile 30.

Personalization

Another feature in the example system 10 is extensive personalization and customization for email handling, email notification, time-sensitive rules, vehicle-aware actions, text-to-speech preferences, and multiple user support.

The email handling settings in the user's profile 30 allow the driver to use the control unit's 11 built-in intelligent email parsing and processing. This enables the driver to avoid receiving notification for every trivial incoming email. Some of the intelligent parsing features include automatic replies, forwarding and prioritization based on content and sender, and substitution of difficult phrases (e.g. email addresses and web site URLs) with simple names and words. The driver can also choose to hear only select information when a new email arrives (e.g., just the sender name, or the sender and subject, or a quick summary). Email "ring tones" are also available for incoming emails based on sender or specific keywords. Prepared text or voice replies can be used to send frequently used responses (e.g. "I'm in transit right now"). Some prepared quick-responses may be used to automatically forward an email to a pre-selected recipient such as an administrative assistant. The driver can also set up both email address configuration and multiple email address rules (e.g. use "me@work.com" when replying to emails sent to "me@work.com," but use "me@mobile.com" when composing new emails).

The driver can also customize notification. This includes prioritizing emails and phone calls based on caller or sender and subject (e.g., never read emails from Ben out loud, or if an email arrives from George, it should be read before others). The driver can also limit the amount of notifications received (e.g., set minimum time between notifications, or maximum number of emails read in a short period of time).

Time-sensitive rules in the profile 30 may include options such as "don't bother me in the morning," or "only notify me about incoming email between these hours." The driver can also configure audible reminder types based on calendar and scheduling items from the mobile communication device. Vehicle-aware actions are configurable based on the presence of the user in the vehicle. These actions include the content of automatic replies and predefined destinations and rules to automatically forward specific emails to an administrative assistant or other individual. These also include actions to take when multiple Bluetooth enabled mobile communication devices are present (e.g., switch to silent "do not disturb" mode, or take no action).

The text-to-speech settings for the control unit 11 are also configurable. This includes speech characteristics such as speed, voice, and volume. The voice may be set to male or female, and may be set to speak a number of languages, including but not limited to US English, UK English, French, Spanish, German, Italian, Dutch, and Portuguese. A base set of languages will be provided with the device, with alternate languages being available in the future. The driver can set personal preferences for pronunciation of specific words, such as difficult contact names, and specialized acronyms or symbols, such as "$H_2O$." By default, most acronyms are spelled out letter by letter (e.g., IMS, USB).

Information about specific words or phrases can be used to enhance both speech recognition performance and text-to-speech performance, which may include context sensitive shortcuts. For example, nicknames could be expanded into an email address if the driver is dictating an email. In addition, email addresses could be expanded to a common name when found. The driver can also set custom voice prompts or greetings.

The control unit 11 also features multiple user support, wherein multiple people can share the same control unit. The device automatically identifies each person by their mobile communication device 12, and maintains individual profiles 30 for each driver.

Connectivity

The connectivity functionality of the control unit 11 enables it to function as a hands-free audio system. It interacts with supported Bluetooth hands-free devices, including but not limited to Bluetooth enabled vehicles (e.g., HS, HFP, and A2DP), after-market hands-free vehicle products, and supported headsets to provide privacy. For vehicles not containing Bluetooth or other wireless support, the control unit 11 can connect directly to the vehicle's audio system 16 through a wired connection. In one example a retrofit solution could be used for existing vehicles lacking wireless connectivity in the form of an optional after-market Bluetooth kit.

The system 10 may include a remote control 26 for accessing the control unit 11. Using this feature, emergency response support may be available for direct assistance in emergencies, providing GPS location information if available. The driver could also use the control unit 11 through an advanced wireless audio/visual system, including such features as streaming music and providing image content (e.g., PowerPoint, images attached in emails, slideshows). Integrated steering-wheel column buttons could also be an available option.

The control unit 11 can also connect to a computer and external devices. This could include personal computers with Bluetooth to conveniently exchange information over a personal area network ("PAN"). This could also include GPS devices (with Bluetooth or other wireless or wired connectivity) for location awareness. This could also include storage devices (Bluetooth or other wireless or wired) for personal e-book libraries, or to manage offline content with the unified hands-free interface. In one example, an optional cable is available for controlling an iPod or other music player with voice commands. Through the device's USB ports, the driver can expand the functionality of the device by attaching such items as a USB GPRS/EDGE/3G device for direct mobile access without a separate mobile communication device, or a USB WiFi for high-speed Internet access.

Upgradeability and Expansion

The driver may add future enhancements to the control unit 11 wirelessly using standard Bluetooth enabled devices. This includes support for wireless transfer with a desktop or notebook computer to transfer and synchronize information. Advanced Bluetooth profile support (e.g. A2DP) for stereo and high quality audio is also available.

As mentioned previously, the control unit 11 will contain two USB ports. The standard USB port or ports will provide convenient access to standard USB devices for storing preferences on a standard USB flash drive; storing and moving off-line memos and transcriptions recorded by the device; and future expansion, upgrades, and add-on features. The dual-purpose USB 2.0 "On-The-Go" port or ports will provide both the aforementioned features to access USB devices, and also direct connections to a computer with a standard cable (e.g. just like connecting a digital camera or GPS unit directly to a computer).

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

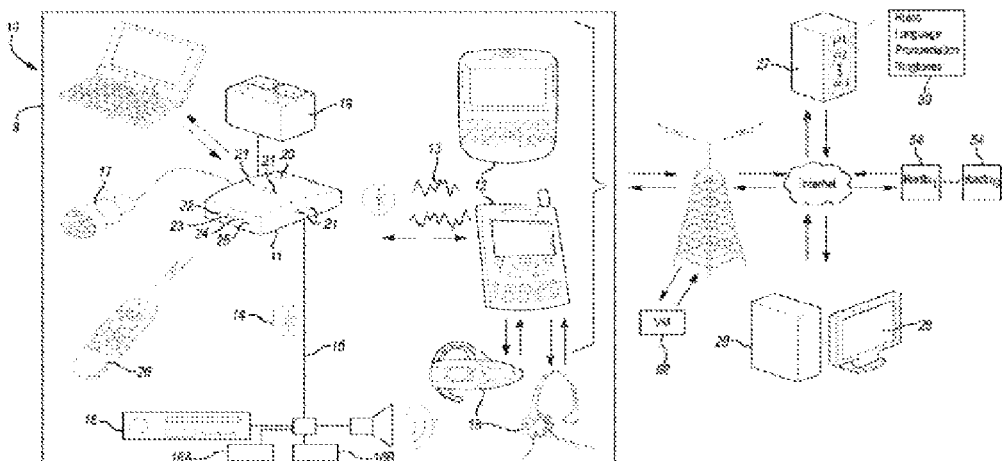

The invention claimed is:

1. An in-vehicle communication system comprising:
a control unit in a vehicle, wherein the control unit is configured to communicate over a data network; and
a profile server storing at least one profile including a user-modifiable list of channels;
the control unit accessing internet radio over the data network, the control unit accessing the at least one profile on the profile server over the data network to control access to internet radio over the data network, wherein the user-modifiable list of channels in the at least one profile can be modified by the control unit and wherein the modification is uploaded over the data network by the control unit to the profile server, the control unit playing internet radio in the vehicle based upon the modified list of channels in the at least one profile and based upon voice commands received from a user in the vehicle.

2. The in-vehicle communication system of claim 1 wherein the control unit further accesses email and presents email as text-to-speech.

3. The in-vehicle communication system of claim 2 wherein the control unit prioritizes the email and the internet radio from the data network based upon the profile.

4. The in-vehicle communication system of claim 1 wherein the control unit selects the internet radio over the data network based upon the profile.

5. The in-vehicle communication system of claim 4 wherein the profile indicates to the control unit to select the internet radio over the data network based upon vehicle speed.

6. The in-vehicle communication system of claim 4 wherein the profile indicates to the control unit to select the internet radio over the data network based upon weather.

7. The in-vehicle communication system of claim 4 wherein the internet radio includes music transmitted over the internet.

8. The in-vehicle communication system of claim 7 wherein the profile indicates to the control unit to select the internet radio based upon whether there is more than one person in the vehicle.

9. The in-vehicle communication system of claim 1 wherein the control unit determines a geographic location of the control unit and wherein the internet radio accessed over the data network is based upon the location of the control unit.

10. The in-vehicle communication system of claim 9 internet radio includes advertisements, and wherein the advertisements are selected and presented based upon the location of the control unit.

11. The system of claim 1 wherein the profile further includes user-organized categories of internet radio channels, and wherein the control unit accesses the internet radio channels based upon the profile.

12. The system of claim 1 wherein the profile indicates favorite artists of the user.

13. The system of claim 1 wherein the profile is accessible and modifiable by the user over the internet.

14. The system of claim 1 wherein the control unit accesses internet radio servers to request specific songs based upon the profile of the user.

15. The method of claim 1 wherein the step of presenting the music includes the step of accessing internet radio servers to request specific songs based upon the profile of the user.

* * * * *

UNITED STATES PATENT AND TRADEMARK OFFICE
CERTIFICATE OF CORRECTION

PATENT NO. : 9,667,726 B2
APPLICATION NO. : 12/824733
DATED : May 30, 2017
INVENTOR(S) : Otman A. Basir It is certified that error appears in the above-identified patent and that said Letters Patent is hereby corrected as shown below:

On the Title Page

Replace the title page with the attached title page showing the corrected illustrative figure.

In the Drawings

Replace drawing sheet 1 and 2 with the attached drawing sheet 1 and 2 with the corrected illustrative figures.

In the Claims

In Claim 10, Column 14, Line 53; before "internet radio" insert --wherein--.

Signed and Sealed this
Twenty-second Day of August, 2017

Joseph Matal
*Performing the Functions and Duties of the*
*Under Secretary of Commerce for Intellectual Property and*
*Director of the United States Patent and Trademark Office*

United States Patent
Basir

(10) Patent No.: US 9,667,726 B2
(45) Date of Patent: May 30, 2017

(54) VEHICLE INTERNET RADIO INTERFACE

(75) Inventor: Otman A. Basir, Waterloo (CA)

(73) Assignee: RIDETONES, INC., Waterloo (CA)

( * ) Notice: Subject to any disclaimer, the term of this patent is extended or adjusted under 35 U.S.C. 154(b) by 0 days.

(21) Appl. No.: 12/824,733

(22) Filed: Jun. 28, 2010

(65) Prior Publication Data
US 2010/0330975 A1 Dec. 30, 2010

Related U.S. Application Data

(60) Provisional application No. 61/221,034, filed on Jun. 27, 2009.

(51) Int. Cl.
H04L 29/08 (2006.01)

(52) U.S. Cl.
CPC .......... *H04L 67/12* (2013.01); *H04L 67/306* (2013.01)

(58) Field of Classification Search
CPC ....... H04L 67/12; H04L 67/306; G06F 15/16; G10L 13/00; H04M 3/00
USPC .......... 455/418, 419, 420; 709/217; 704/260
See application file for complete search history.

(56) References Cited

U.S. PATENT DOCUMENTS

| | | | |
|---|---|---|---|
| 3,928,724 A | 12/1975 | Andersen et al. | |
| 4,083,003 A | 4/1978 | Haemmig et al. | |
| 4,532,052 A | 7/1985 | Weaver et al. | |
| 4,591,823 A | 5/1986 | Horvat | |
| 4,989,144 A | 1/1991 | Barnett et al. | |
| 5,177,685 A | 1/1993 | Davis et al. | |
| 5,246,073 A | 9/1993 | Sandiford et al. | |
| 5,488,360 A | 1/1996 | Ray | |
| 5,638,425 A | 6/1997 | Meador et al. | |
| 5,760,742 A | 6/1998 | Branch et al. | |
| 5,836,392 A | 11/1998 | Urwin-Smith | |
| 5,912,951 A | 6/1999 | Checchio et al. | |
| 5,931,907 A | 8/1999 | Davies et al. | |
| 5,938,706 A | 8/1999 | Feldman et al. | |
| 5,944,783 A | 8/1999 | Nieten | |
| 5,963,618 A | 10/1999 | Porter | |
| 5,983,108 A | 11/1999 | Kennedy et al. | |

(Continued)

FOREIGN PATENT DOCUMENTS

| | | |
|---|---|---|
| CA | 2405813 A1 | 11/2001 |
| DE | 19920227 A1 | 11/2000 |

(Continued)

OTHER PUBLICATIONS

International Search Report for PCT Application No. PCT/CA2006/000946, Nov. 8, 2006.

(Continued)

*Primary Examiner* — Lester Kincaid
*Assistant Examiner* — Sayed T Zewari
(74) *Attorney, Agent, or Firm* — Carlson, Gaskey & Olds, P.C.

(57) ABSTRACT

The invention provides a internet radio interface for use in vehicles. The interface allows a device unit, with wireless capability and voice interface technology, to communicate with a vehicle, mobile phone, and portal in order to manage and upload various user preferences to the device unit as set out by the user prior to getting into the vehicle. The device unit interacts with the user to permit various functions and access preferable channels as well as managing secondary functions of the user, including cell phone communications.

15 Claims, 2 Drawing Sheets